(12) United States Patent
Vangala et al.

(10) Patent No.: US 12,284,604 B2
(45) Date of Patent: Apr. 22, 2025

(54) USER EQUIPMENT ONBOARDING AND NETWORK CONGESTION CONTROL IN STANDALONE NON-PUBLIC NETWORK DEPLOYMENTS

(71) Applicant: Apple Inc., Cupertino, CA (US)

(72) Inventors: Sarma V. Vangala, Campbell, CA (US); Fangli Xu, Beijing (CN); Haijing Hu, Los Gatos, CA (US); Naveen Kumar R. Palle Venkata, San Diego, CA (US); Ralf Rossbach, Munich (DE); Sethuraman Gurumoorthy, San Ramon, CA (US); Sree Ram Kodali, San Jose, CA (US); Srinivasan Nimmala, San Jose, CA (US); Srirang A. Lovlekar, Fremont, CA (US); Vijay Venkataraman, San Jose, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,592

(22) PCT Filed: May 10, 2021

(86) PCT No.: PCT/CN2021/092734
§ 371 (c)(1),
(2) Date: May 3, 2022

(87) PCT Pub. No.: WO2022/236567
PCT Pub. Date: Nov. 17, 2022

(65) Prior Publication Data
US 2024/0306083 A1    Sep. 12, 2024

(51) Int. Cl.
H04W 48/18    (2009.01)
H04W 12/06    (2021.01)
(Continued)

(52) U.S. Cl.
CPC ........... *H04W 48/18* (2013.01); *H04W 12/06* (2013.01); *H04W 48/16* (2013.01); *H04W 60/04* (2013.01); *H04W 76/10* (2018.02)

(58) Field of Classification Search
None
See application file for complete search history.

(56) References Cited

U.S. PATENT DOCUMENTS

2021/0058784 A1*  2/2021  Kedalagudde ........ H04W 48/18
2023/0021642 A1*  1/2023  Grayson ................. H04W 8/12

FOREIGN PATENT DOCUMENTS

| CN | 111757557 | 10/2020 |
|----|-----------|---------|
| WO | 2020/194273 | 10/2020 |

(Continued)

OTHER PUBLICATIONS

Huawei et al., "New Solution UE onboarding and provisioning for SNPN subscription", 3GPP SA WG2 Meeting #136AH, S2-2000645, Jan. 17, 2020, 8 sheets.

(Continued)

*Primary Examiner* — Hong Shao
(74) *Attorney, Agent, or Firm* — Fay Kaplun & Marcin, LLP

(57) ABSTRACT

A user equipment (UE) is configured to join a standalone non-public network (SNPN). The receives SNPN information from one or more broadcast messages transmitted from a base station serving as an onboarding base station for the SNPN, determines whether the onboarding base station may be used for onboarding by the UE based on the SNPN information and UE SNPN information stored at the UE and onboards the UE to the SNPN when it is determined that the onboarding base station may be used for onboarding by the UE.

17 Claims, 6 Drawing Sheets

(51) Int. Cl.
*H04W 48/16* (2009.01)
*H04W 60/04* (2009.01)
*H04W 76/10* (2018.01)

(56) References Cited

FOREIGN PATENT DOCUMENTS

| | | |
|---|---|---|
| WO | 2020/250664 | 12/2020 |
| WO | 2021/082527 | 5/2021 |

OTHER PUBLICATIONS

3rd Generation Partnership Project; Technical Specification Group Services and System Aspects; System architecture for the 5G System (5GS); Stage 2 (Release 17); 3GPP TS 23.501 V17.0.0; Mar. 30, 2021, 489 sheets.

Qualcomm Incorporated, "O-SNPN selection", SA WG2 Meeting #143-e, S2-2100807, Feb. 18, 2021, 4 sheets.

\* cited by examiner

USER EQUIPMENT ONBOARDING AND NETWORK CONGESTION CONTROL IN STANDALONE NON-PUBLIC NETWORK DEPLOYMENTS

TECHNICAL FIELD

This application relates generally to wireless communication, and in particular relates to User Equipment Onboarding and Network Congestion Control in Standalone Non-Public Network Deployments.

BACKGROUND

A user equipment (UE) may establish a connection to at least one of a plurality of different networks or types of networks. 5G New Radio (NR) has introduced many radio access network (RAN) and core network (CN) enhancements, as well as an enhanced security architecture. A Non-Public Network (NPN) is a 5G system (5GS) deployed for non-public use, e.g., enterprise networks such as factories including IoT devices, enterprise IT networks, or a third part-specific cellular network, where the third party content is hosted at a distributed node (DN). An NPN may be deployed as a public network integrated (PNI) NPN, where the PNI NPN relies on the support of a PLMN, e.g., includes a slice of the PLMN. An NPN may also be deployed as a standalone NPN (SNPN), where the SNPN is operated by an NPN operator and does not rely on network functions provided by a public land mobile network (PLMN).

SNPN onboarding refers to the provisioning of information to a UE for access to the SNPN. When an onboarding SNPN (O-SNPN) next generation Node B (gNB) broadcasts as an onboarding network, various issues may arise. For example, the O-SNPN gNB may seek to indicate that all UEs with the SNPN credentials may be allowed to onboard, or that only a subset of the credentialed UEs may be allowed to onboard. In another example, the SNPN and an authentication server may be managed by different entities. In still another example, the radio access network used for onboarding may be congested.

SUMMARY

Some exemplary aspects are related to a processor of a user equipment (UE) configured to perform operations. The operations include receiving standalone non-public network (SNPN) information from one or more broadcast messages transmitted from a base station serving as an onboarding base station for the SNPN, determining whether the onboarding base station may be used for onboarding by the UE based on the SNPN information and UE SNPN information stored at the UE and onboarding the UE to the SNPN when it is determined that the onboarding base station may be used for onboarding by the UE.

Other exemplary embodiments are related to a processor of a base station configured to perform operations. The operations include transmitting standalone non-public network (SNPN) information in one or more broadcast messages, wherein the base station serves as an onboarding base station for the SNPN and performing a procedure to onboard a user equipment (UE) to the SNPN when the UE determines that the onboarding base station may be used for onboarding by the UE based on the SNPN information and UE SNPN information stored at the UE.

Still further exemplary embodiments are related to a processor of a user equipment (UE) configured to perform operations. The operations include receiving standalone non-public network (SNPN) information from one or more broadcast messages transmitted from a base station serving as an onboarding base station for the SNPN, wherein the one or more broadcast messages further indicate onboarding base station support with a third party authentication server, initiating an onboarding procedure to the onboarding base station when it is determined that the onboarding base station may be used for onboarding by the UE, receiving an indication of a global vendor identifier (ID) for the third party authentication server and initiating a non-access stratum (NAS) authentication procedure when the global vendor ID matches a stored global vendor ID on the subscriber identification module (SIM) of the UE.

Additional exemplary embodiments are related to a processor of a base station configured to perform operations. The operations include transmitting standalone non-public network (SNPN) information in one or more broadcast messages, wherein the base station serves as an onboarding base station for the SNPN and the one or more broadcast messages further indicate base station support with a third party authentication server, entering an onboarding procedure with the UE when it is determined that the onboarding base station may be used for onboarding by the UE and transmitting an indication of a global vendor identifier (ID) for the third party authentication server.

Further exemplary embodiments are related to a processor of a user equipment (UE) configured to perform operations. The operations include receiving standalone non-public network (SNPN) information from one or more broadcast messages transmitted from a base station serving as an onboarding base station for the SNPN, wherein the one or more broadcast messages further indicate parameters for barring control information indicating access for UEs onboarding to the SNPN, determining whether onboarding access is allowed based on the indicated parameters and a UE subscriber identification module (SIM) configuration including an access identity specific to UE onboarding and initiating an access procedure including a cause code related to onboarding.

Other exemplary embodiments are related to a processor of a base station configured to perform operations. The operations include transmitting standalone non-public network (SNPN) information in one or more broadcast messages, wherein the base station serves as an onboarding base station for the SNPN and the one or more broadcast messages further indicate parameters for barring control information indicating access for UEs onboarding to the SNPN, wherein the UE determines whether onboarding access is allowed based on the indicated parameters and a UE subscriber identification module (SIM) configuration including an access identity specific to UE onboarding and entering an access procedure with the UE, wherein the onboarding base station receives a cause code related to onboarding.

DETAILED DESCRIPTION

Figure 1:
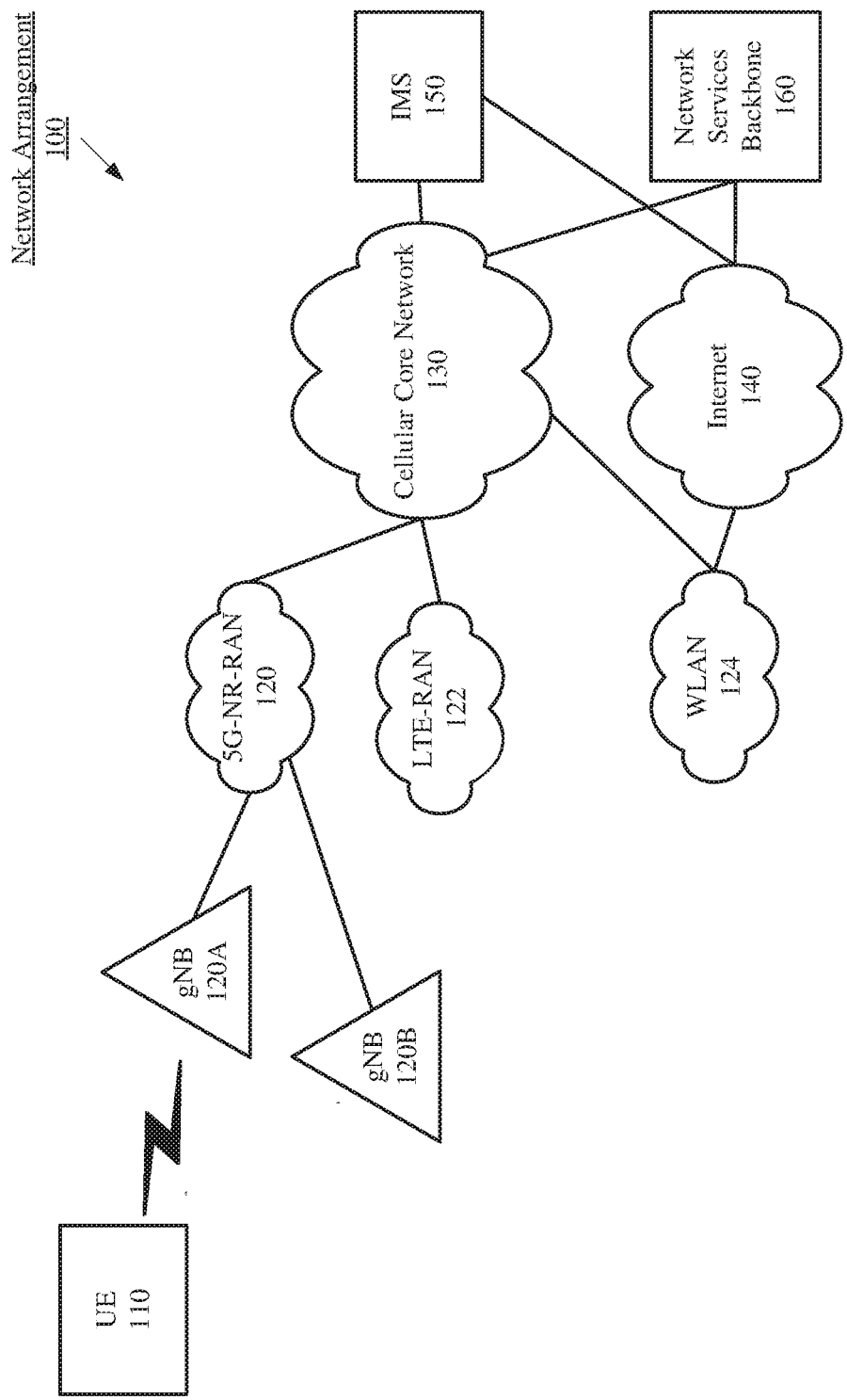
FIG. 1 shows a network arrangement according to various exemplary embodiments.

The exemplary aspects may be further understood with reference to the following description and the related appended drawings, wherein like elements are provided with the same reference numerals. The exemplary aspects describe operations for user equipment (UE) onboarding and authentication for accessing a standalone non-public network (SNPN).

The exemplary aspects are described with regard to a UE. However, the use of a UE is provided for illustrative purposes. The exemplary aspects may be utilized with any electronic component that may establish a connection with a network and is configured with the hardware, software, and/or firmware to exchange information and data with the network. Therefore, the UE as described herein is used to represent any electronic component that is capable of accessing an SNPN.

The exemplary aspects are described with regard to the network being a 5G New Radio (NR) network and a base station being a next generation Node B (gNB). The 5G NR network may be an SNPN. Certain portions (frequencies) of the 5G network may be used for onboarding to the SNPN (O-SNPN), and other frequencies may be used for operations with the SNPN. In addition, throughout this description, a gNB may be referred to as an "onboarding gNB" or "O-gNB." The SNPN may be referred to as a subscription owner SNPN (SO-SNPN). A gNB that is acting as an O-gNB may provide initial access to the UE for SNPN provisioning purposes, while the SO-SNPN may utilize the same gNB or different access nodes for operations with the SNPN. However, the use of the 5G NR network, the gNB, the O-SNPN, the SNPN and the described onboarding operations are provided for illustrative purposes. The exemplary aspects may apply to any type of network that utilizes similar functionalities.

In addition, throughout this description, the term "onboarding" is used to describe the process by which a UE may join an SNPN. The exemplary operations that may be performed during onboarding include identifying the network entity performing UE subscription provisioning, determining the location of the network entity and any other operation that allows remote provisioning of new or updated information to the UE to enable the UE to access the SNPN. However, it should be understood that the above operations are only examples and onboarding may include other operations and is not required to include the operations listed above.

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary aspects, the UE 110 may establish a connection with the 5G NR-RAN 122. The 5G NR-RAN 120 may correspond to an onboarding standalone non-public network (O-SNPN) or an SNPN.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. Reference to two gNBs 120A, 120B is merely for illustrative purposes. The exemplary aspects may apply to any appropriate number of gNBs. The gNBs 120A, 120B may correspond to onboarding gNBs (O-gNBS) and/or gNBs deployed for SNPN operations.

In addition to the networks 120, 122 and 124 the network arrangement 100 also includes a cellular core network 130, the Internet 140, an IP Multimedia Subsystem (IMS) 150, and a network services backbone 160. The cellular core network 130, e.g., the 5GC for the 5G NR network, may be considered to be the interconnected set of components that manages the operation and traffic of the cellular network. The cellular core network 130 also manages the traffic that flows between the cellular network and the Internet 140. An SNPN may utilize a core network 130 separate from a public land mobile network (PLMN), to be described in greater detail below.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
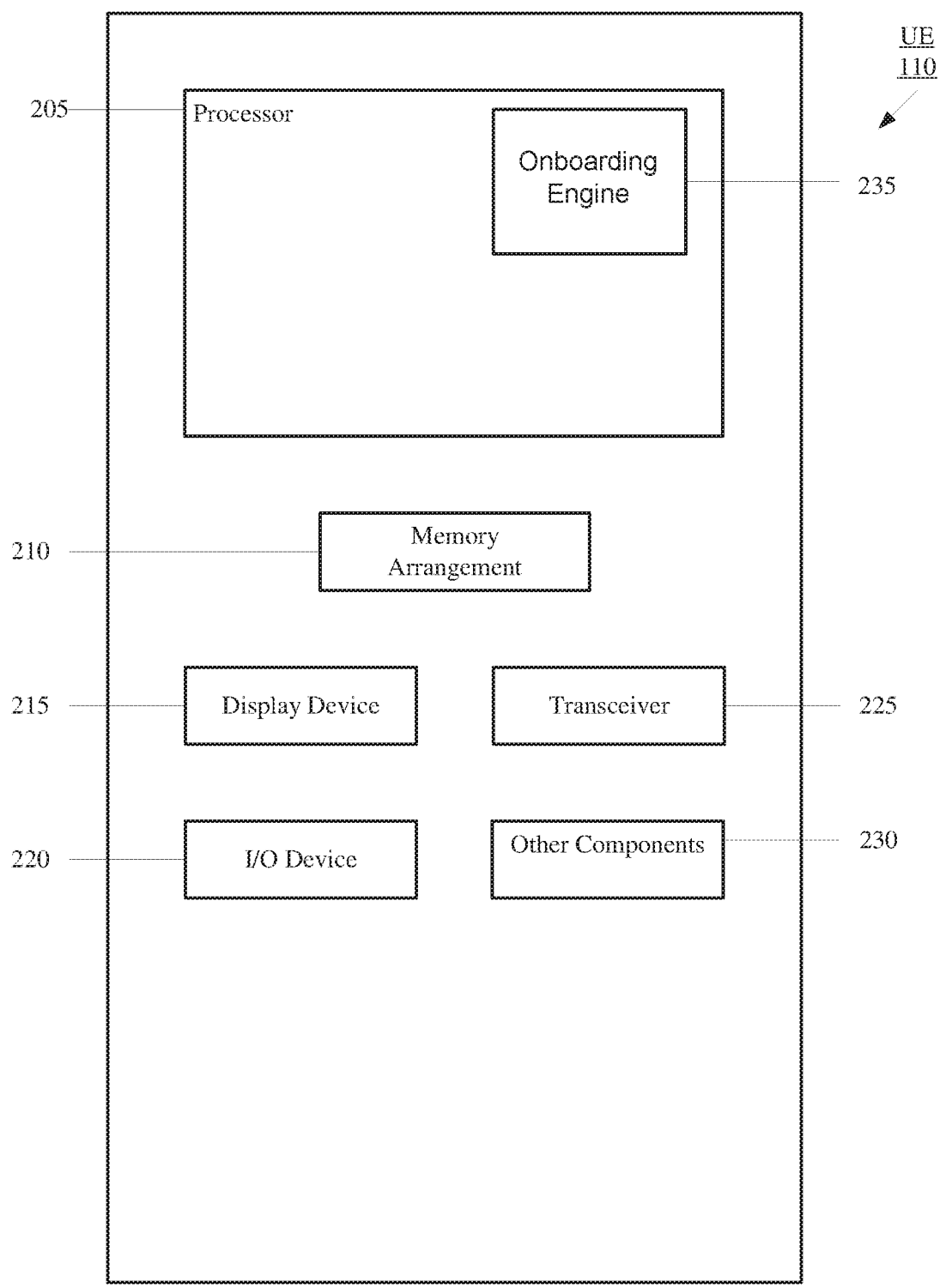
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. Additionally, the UE 110 may be configured to access an SNPN.

The processor 205 may be configured to execute a plurality of engines for the UE 110. For example, the engines may include an onboarding engine 235 for performing operations including onboarding to a configured SNPN. These operations will be described in greater detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary aspects may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
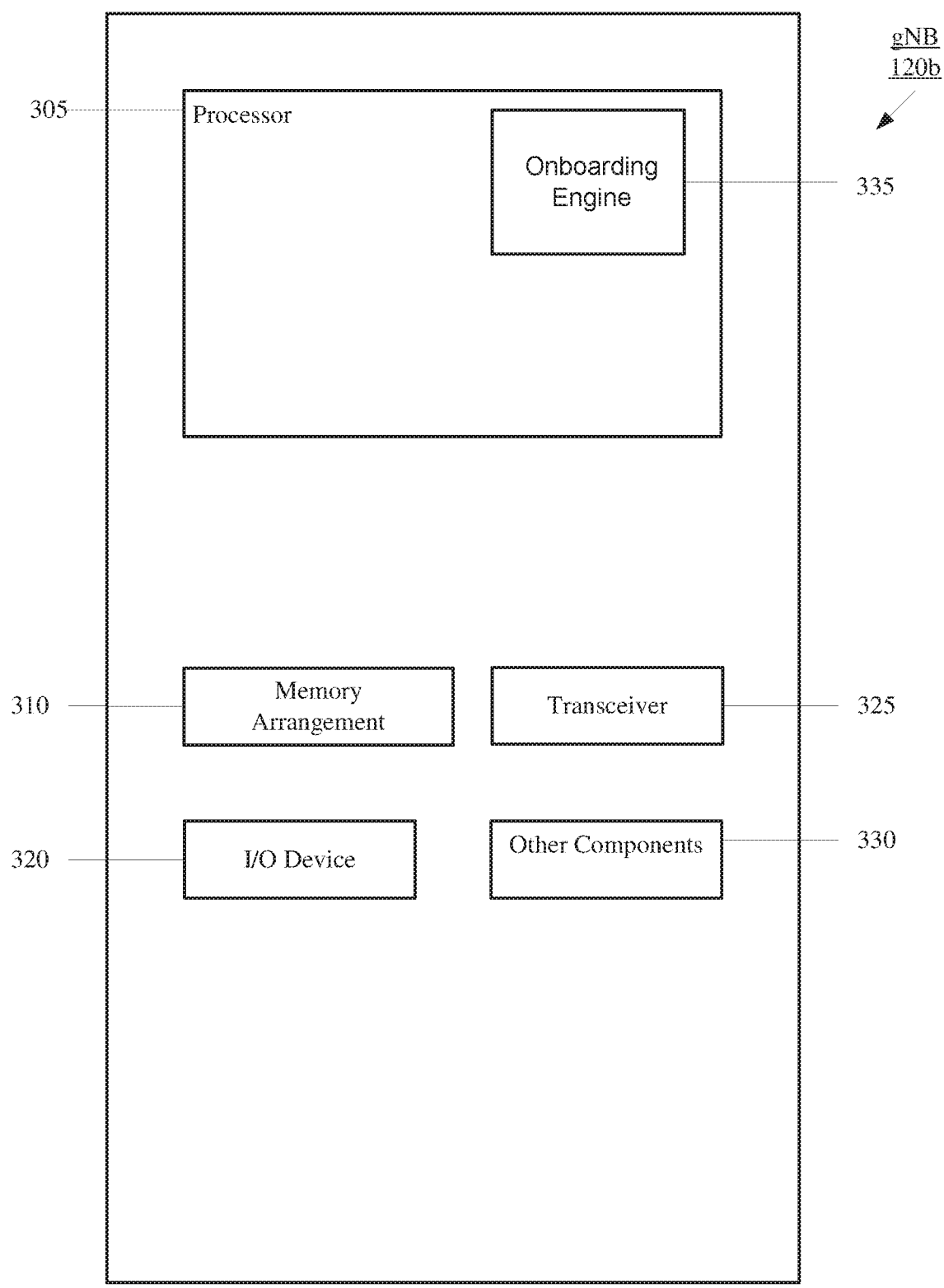
FIG. 3 shows an exemplary network base station according to various exemplary embodiments.

FIG. 3 shows an exemplary network base station, in this case gNB 120A, according to various exemplary embodiments. As noted above with regard to the UE 110, the gNB 120A may represent a serving cell for the UE 110. The gNB 120A may represent any access node of the 5G NR network through which the UE 110 may establish a connection and manage network operations. Additionally, the gNB 120A may represent an O-gNB for onboarding to an SNPN. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, when the gNB 120A is an onboarding gNB (O-gNB) for a UE, the engines may include an onboarding engine 335 for performing operations to onboard a UE to an SNPN. These operations will be discussed in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

SNPN Access

5G New Radio (NR) has introduced many radio access network (RAN) and core network (CN) enhancements, as well as an enhanced security architecture. A Non-Public Network (NPN) is a 5G system (5GS) deployed for non-public use, e.g., enterprise networks such as factories including IoT devices, enterprise IT networks, or a third party-specific cellular network, where third party content is hosted at a distributed node (DN). An NPN may be deployed as a public network integrated (PNI) NPN, where the PNI NPN relies on the support of a PLMN, e.g., includes a slice of the PLMN. An NPN may also be deployed as a standalone NPN (SNPN), where the SNPN is operated by an NPN operator and does not rely on network functions provided by a public land mobile network (PLMN).

A UE may be authorized to access only NPN services, only regular PLMN services, or both NPN and PLMN services simultaneously. An SNPN-enabled UE is configured with a subscription permanent identifier (SUPI) and credentials for each SNPN it is authorized to access, e.g., an SNPN ID list. Each SNPN is identified by a PLMN ID portion and a network identifier (NID) portion. NIDs are assigned such that the combination of the NID and the PLMN ID is globally unique. An NG-RAN node, e.g., a gNB, providing access to one or more SNPNs may broadcast the PLMN ID(s) and NID(s) identifying the SNPN to which it provides access. A UE operating in SNPN access mode reads the available PLMN IDs and NIDs from the broadcast system information. When the UE initially registers to an SNPN, the UE indicates the selected NID and the corresponding PLMN ID to the onboarding SNPN (O-SNPN).

SNPN onboarding refers to the provisioning of information to a UE for access to the SNPN. When an onboarding SNPN (O-SNPN) gNB broadcasts as an onboarding network, various issues may arise. For example, the O-SNPN gNB may seek to indicate that all UEs with the SNPN credentials may be allowed to onboard, or that only a subset of the credentialed UEs may be allowed to onboard. In another example, the SNPN and an authentication server may be managed by different entities. In still another example, the radio access network used for onboarding may be congested.

Figure 4:
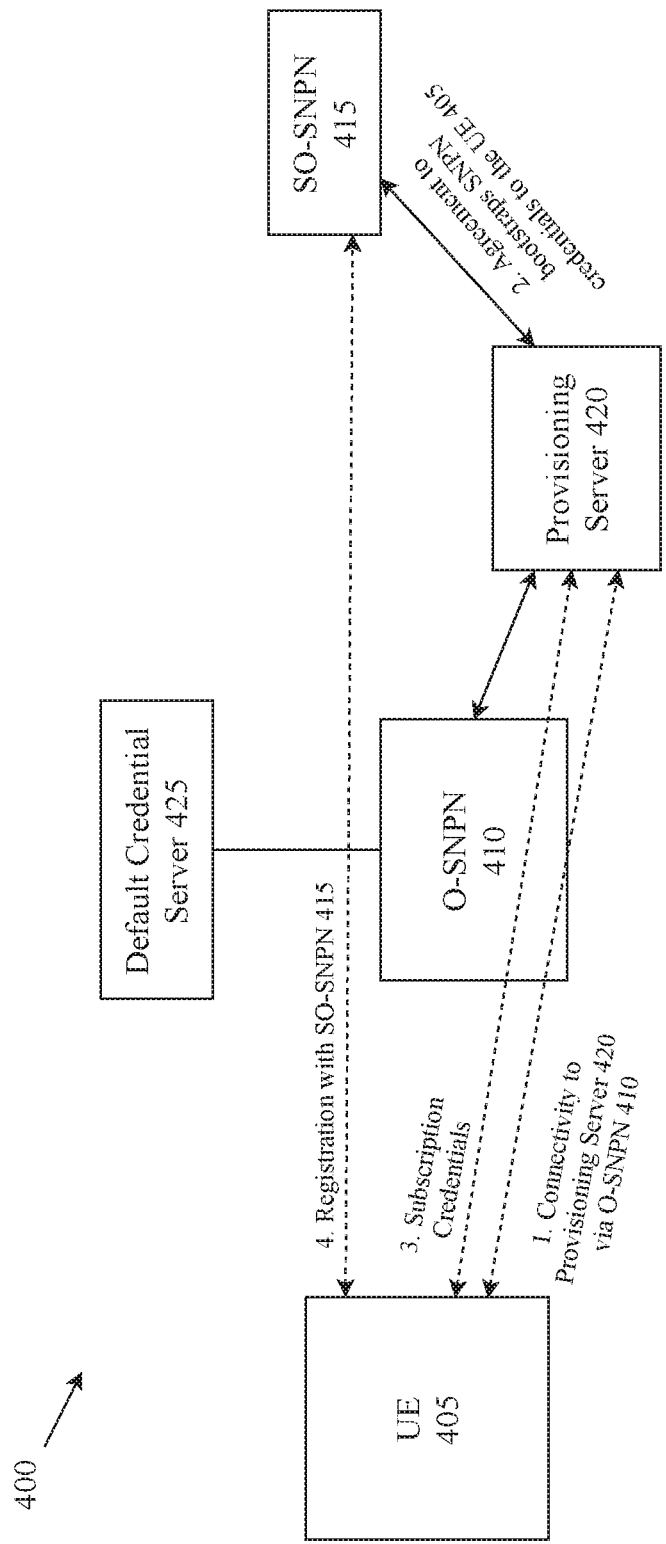
FIG. 4 shows an exemplary onboarding architecture for a user equipment (UE) to access a standalone non-public network (SNPN) according to various exemplary embodiments.

FIG. 4 shows an exemplary onboarding architecture 400 for a user equipment (UE) to access a standalone non-public network (SNPN) according to various exemplary embodiments. In a first step, the UE 405 acquires initial connectivity to the onboarding SNPN (O-SNPN) 410 and a provisioning server 420. In a second step, the provisioning server 420 may communicate with the subscription owner SNPN (SO-SNPN) 415 so that SNPN credentials may be provided to the UE 405. In a third step, the SNPN credentials may be provided to the UE 405. In a fourth step, the UE may register with the SO-SNPN 415.

Regarding the first and third steps, certain frequencies may be used by the O-SNPN 410 to connect the UE 405 with the provisioning server 420 for initial access and provisioning purposes. The UE 405 may select the O-SNPN 410 based on system information broadcast by the O-SNPN 410 to connect to the provisioning server 420. Regarding the fourth step, when proper credentials are provided to the UE 405, the UE 405 may register with the SO-SNPN 415 on certain other frequencies used by the SNPN. In some embodiments, the O-SNPN 410 and the SO-SNPN 415 may be the same, while in other embodiments they may be different.

The default credential server (DCS) 425 may assign and configure a unique UE identifier for the UE 405. As part of the onboarding process, the UE 405 may access the O-SNPN 410 based on, for example, default UE credentials provided by the provisioning server 420. The subscription owner (SO) stores and provides subscription data and optionally other configuration information via the provisioning server 420 to the UE 405. The O-SNPN 410 has access to the DCS 425 and verifies that the UE 405 is subject to onboarding based on the UE identifier and the associated default UE credentials. The DCS 425 is used for 5GS-level UE authentication/authorization during registration to O-SNPN 410 for onboarding purposes. In some scenarios the DCS 425 and the provisioning server (PS) 420 may be the same entity. In scenarios where the DCS 425 and the PS 420 are different entities, they may communicate with each other to share security-related information for the UE 405.

Onboarding Solutions

According to existing specifications, a gNB may broadcast support as an on-boarding network for an SNPN. As discussed above, the onboarding gNB may be referred to as an O-gNB. In RAN2 #112-e, it was agreed to use 1-bit in SIB1 to indicate on-boarding support for the gNB. For example, the information element (IE) SNPN_ID bool_indicating_onboarding_allowed may be set to 0 (indicating onboarding support) or 1 (indicating no onboarding support). However, with only a single bit available, no option is available for the network to indicate if all UEs can be onboarded or only a selected set may be onboarded.

According to a first option, the O-gNB may further indicate support for all users to be onboarded to the SNPN by expanding the 1-bit field in the above-mentioned IE to create a new IE SNPN_ID bool_indicating_onboarding_allowed bool_indicating_onboarding_allowed_for_all_UEs. If (bool_indicating_onboarding_allowed_for_all_UEs=1), indicating that onboarding for all users is not supported on the SNPN ID, further information may be used to indicate which UEs are allowed to onboard on the SNPN. To supply this information, a new field may be added in SIB1, or a new supporting SIB (for all NPN/SNPN) may be used to broadcast information regarding which specific UEs or group(s) of UEs are allowed to be on-boarded on a particular SNPN ID. This scenario will be discussed further below with respect to the fourth option.

According to a second option, the SNPN onboarding options are configured entirely using the UE SIM instead of the SIB. In the second option, the O-gNB is not required to indicate onboarding support, relative to the first option discussed above. The following new SIM fields may be added to allow for onboarding.

First, a new O-SNPN tag may be added to the SIM to indicate if a particular SNPN-ID is available for on-boarding purposes. The O-SNPN tag may be a 1-bit field allowing for a low impact on the SIM. Second, an additional allow_all_UEs tag within the SIM indicates if all UEs can on-board using the particular SNPN ID associated with the O-SNPN tag. If the SNPN-ID is indicated as available for onboarding for all UEs, then the UE proceeds with the onboarding procedure. If the SNPN-ID is indicated as not available for onboarding for all UEs, an alternate mechanism, such as the additional information provided in SIB1 or in a new SIB described above for the first option, may be used to broadcast information regarding which specific UEs or group(s) of UEs are allowed to be on-boarded on a particular SNPN ID.

The second option allows an individual UE to determine whether the onboarding procedure may be performed on a particular SNPN-ID and can reduce the broadcasting bandwidth for the onboarding procedure.

According to a third option, a combination of the first and second options may be used. Specifically, the UE SIM is provisioned to include the new fields discussed above with respect to the second option, e.g., an O-SNPN tag and an additional allow_all_UEs tag. Additionally, the SIB1 includes the new IE with the additional fields, e.g., fields indicating whether onboarding is supported and whether all UEs may onboard. Upon decoding SIB1, if the SNPN ID matches with the UE SIM O-SNPN information, the UE then proceeds with on-boarding. If the information does not match, then the UE will not proceed.

In a fourth option, a group ID is introduced as a subset of SNPN IDs. Thus, the UE SIM has a group ID associated with an SNPN ID, and the O-gNB broadcasts a group ID associated with the SNPN ID to indicate the group that is allowed to onboard. If the broadcast group ID matches the group ID on the UE SIM, then the UE can proceed with onboarding.

Additionally, within a particular group, a new field may be used to indicate specific UE IDs that can onboard. Thus, the on-boarding can be made more congestion-proof while still being expandable. If the SIB1 does not have enough space to indicate this UE #field, a new NPN/SNPN SIB may be used to indicate the individual UEs within the group.

Figure 5:
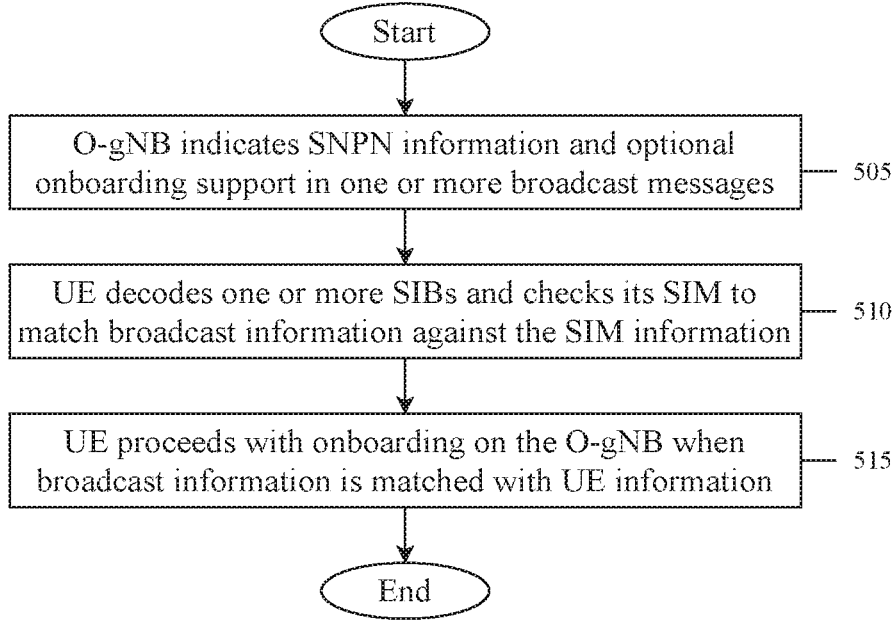
FIG. 5 shows a method for determining gNB onboarding support for a UE according to various exemplary embodiments.

FIG. 5 shows a method 500 for determining gNB onboarding support for a UE according to various exemplary embodiments. In 505, an O-gNB indicates SNPN information and optional onboarding support in one or more broadcast messages, e.g., one or more SIBs. As discussed above, for all options, an O-gNB broadcasts an SNPN ID in SIB1 corresponding to the SNPN (s) for which it provides onboarding to UEs. In some options, the O-gNB further indicates that the O-gNB is an onboarding gNB, and whether all UEs or only a subset of UEs can onboard. This information may also be broadcast in SIB1. In still other embodiments, the O-gNB can indicate one or more group IDs or individual UE IDs in a separate SIB, e.g., a new NPN/SNPN SIB.

In 510, the UE decodes the one or more SIBs and checks the SIM to match the broadcast information against the SIM information. In some embodiments, the UE matches only the broadcast SNPN ID against SNPN IDs stored on the UE SIM. The UE SIM may additionally store an O-SNPN tag and an allow_all_UEs tag associated with the SNPN ID. In still other embodiments, the UE may additionally store a group ID. When the O-gNB indicates a group ID or an individual UE ID in a separate SIB, this information may be checked against the group ID associated with the SNPN ID on the SIM and/or the UE ID.

In 515, the UE proceeds with onboarding on the O-gNB when the broadcast information is matched with the UE information. In some embodiments, only the SNPN ID need be matched, wherein the UE proceeds with onboarding when the O-gNB broadcasts the additional onboarding support and/or when the UE SIM indicates the additional onboarding support. In other embodiments, the group ID and/or the individual UE ID is also matched prior to the UE proceeding with onboarding on the O-SNPN.

Onboarding with Third Party Authentication Server

In another embodiment, the gNB broadcasts support as a third party authentication server using 1-bit in SIB1. As discussed above, 1-bit in SIB1 may be used to indicate on-boarding support. Thus, this 1-bit or an additional 1-bit (in addition to the onboarding support bits discussed above) may be used to indicate the O-gNB support as a third party authentication server. However, for added security, the UE SIM may also store a vendor ID for third party authentication for the onboarding process, to ensure that the device can access this server only, for example, to ensure that the authentication server is not posed by a rogue third party server.

According to a first option, the O-gNB may indicate a global vendor ID for the third party authentication server in an RRC Connection Setup Complete message. A global vendor ID is created for all potential 3GPP vendors who can provide the third party authentication setup. In the RRCConnectionSetupComplete, the credentials of this vendor ID is issued to the UE. The UE, upon receiving this information, can validate the vendor ID credentials and then initiate the NAS authentication mechanism.

In a second option, an indexed vendor ID may be used. An indexed standardized table with all vendor IDs and the indices may be propagated through the RRCConnectionSetupComplete message or a SIB, allowing for the IDs to be maintained at the RAN layer itself instead of storing this information in the core network. Similar to the first option, the UE can validate whether the authentication with the particular vendor needs to be completed and initiates the NAS authentication mechanism if the validity check of the vendor ID passes.

In a third option, the vendor ID may be indicated in the NAS Registration Accept message, where the authentication is coming from a trusted source (unlike in the first option, where fake gNBs can spoof as trusted RANs) after which the service can be used. When the UE receives the vendor ID in the RegistrationAccept message, with the ReRegistrationRequired field set to true, the UE will re-trigger the registration with the new keys provided in the NAS message.

Figure 6:
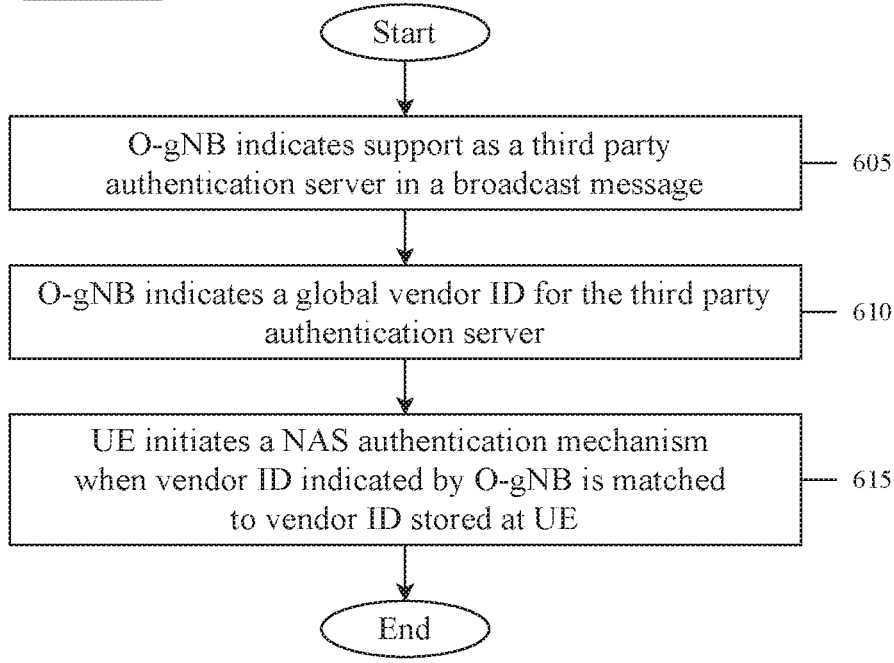
FIG. 6 shows a method for third party authentication being performed at an O-gNB according to various exemplary embodiments.

FIG. 6 shows a method 600 for third party authentication being performed at an O-gNB according to various exemplary embodiments. In 605, the O-gNB indicates support as a third party authentication server in a broadcast message, e.g. SIB1.

In 610, the O-gNB indicates a global vendor ID for the third party authentication server. According to the options discussed above, the global vendor ID may be indicated in an RRCConnectionSetupComplete or in a NAS Registration Accept message. The global vendor ID may be indicated as an indexed vendor ID, in which case an indexed standardized table containing the vendor IDs and the indices are propagated in the RRCConnectionSetupComplete or in an SIB.

In 615, the UE initiates a NAS authentication mechanism when the vendor ID indicated by the O-gNB is matched to the vendor ID stored at the UE. In one option, the UE initiates a first NAS authentication mechanism, prior to receiving the vendor ID, and then re-registers when the vendor ID is received in the NAS Registration Accept message of the first NAS authentication mechanism.

Congestion Control

Access control refers to a congestion control method for preventing access to a network. Access control may be implemented at the UE, wherein, prior to requesting access, the UE determines whether a connection request should be barred based on broadcast information. Access control may also be implemented at the base station, where the base station determines whether a connection request sent from the UE should be served or rejected with a RRCConnectionReject message. One or both methods may be used by a mobile operator, depending on traffic conditions.

Unified Access Control (UAC) refers to a mechanism for access control in which a UE associates itself with an Access Identity, based upon parameters received in barring control information broadcast by the 5G network in SIB1, and the UE SIM configuration indicating the validity of the various Access Identities for the UE. When the NAS detects an access event, the NAS maps the type of request to one or more access identities and one access category, and lower layers perform access barring checks for that request based on the determined access identities and access category.

When the SNPN is congested, to stop the onboarding process, the O-SNPN indication bit may simply be turned off to stop onboarding. However, in cases of heavy congestion, this may cause the entire onboarding procedure to stop, allowing no new UEs to join into the system.

According to the following exemplary embodiments, the SNPN may allow some UEs to onboard, even in congested situations. In a first option, a new UAC access category, specific to SNPN onboarding is introduced to expand UAC to control congestion. One of the reserved Access Class category IDs (3-10) may be used for this purpose.

In a first option, an RRCConnectionRequest with a new cause code for onboarding may be introduced for all onboarding UEs, thus providing more flexibility to show UE intention and add additional parameters for onboarding as needed.

In a second option, the existing RRCConnectionReject may be expanded to include a timer procedure for the onboarding session. The second option may include a new rejectCauseCode (e.g. authentication server busy) with a timer value that allows the UE to retry onboarding upon expiry.

Figure 7:
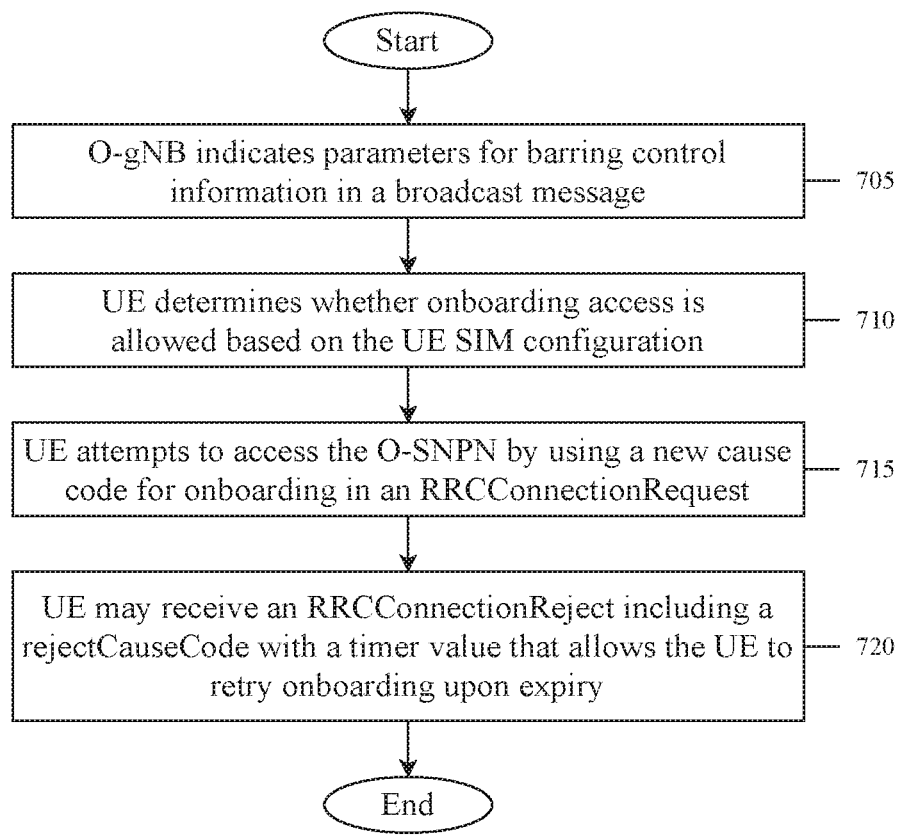
FIG. 7 shows a method for congestion control for an O-SNPN according to various exemplary embodiments.

FIG. 7 shows a method 700 for congestion control for an onboarding SNPN according to various exemplary embodiments. In 705, the O-gNB indicates parameters for barring control information in a broadcast message, e.g. SIB1. The indicated parameters may indicate access for UEs onboarding to the SNPN. In 710, the UE determines whether onboarding access is allowed based on the UE SIM configuration. The UE SIM configuration may include an Access Identity specific for UE onboarding.

In 715, the UE attempts to access the O-SNPN by using a new cause code for onboarding in an RRCConnectionRequest. If access is barred, in 720, the UE may receive an RRCConnectionReject message including a rejectCauseCode (e.g., authentication server busy) with a timer value that allows the UE to retry onboarding upon expiry.

Those skilled in the art will understand that the above-described exemplary aspects may be implemented in any suitable software or hardware configuration or combination thereof. An exemplary hardware platform for implementing the exemplary aspects may include, for example, an Intel x86 based platform with compatible operating system, a Windows OS, a Mac platform and MAC OS, a mobile device having an operating system such as iOS, Android, etc. In a further example, the exemplary aspects of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   receiving standalone non-public network (SNPN) information from one or more broadcast messages transmitted from a base station serving as an onboarding base station for the SNPN, wherein the one or more broadcast messages includes a system information block (SIB) comprising a first indication of an SNPN identifier (SNPN-ID) for the SNPN, a second indication that the onboarding base station supports onboarding and a third indication that the onboarding base station supports onboarding either for all UEs or for only a subset of all UEs;
   determining whether the onboarding base station is to be used for onboarding by the UE based on the SNPN information and UE SNPN information stored at the UE; and
   onboarding the UE to the SNPN when it is determined that the onboarding base station is to be used for onboarding by the UE.

2. The processor of claim 1,
   wherein the UE determines that the onboarding base station is to be used for onboarding by the UE based on the indicated SNPN-ID matching a stored SNPN-ID on a subscriber identification module (SIM) of the UE and further based on the second and third indications.

3. The processor of claim 1,
   wherein the one or more broadcast messages further includes a second SIB including a fourth indication of a group ID or a UE ID,
   wherein the UE determines that the onboarding base station is to be used for onboarding by the UE based on the indicated SNPN-ID matching a stored SNPN-ID on a subscriber identification module (SIM) of the UE, further based on the second indication, and further based on the indicated group ID or indicated UE ID matching a stored group ID or stored UE ID on the SIM of the UE.

4. The processor of claim 1,
   wherein the UE determines that the onboarding base station is to be used for onboarding by the UE based on the indicated SNPN-ID matching a stored SNPN-ID on a subscriber identification module (SIM) of the UE, further based on the second and third indications, and further based on the SNPN-ID on the SIM being associated with onboarding for all UEs.

5. The processor of claim 1, wherein the SIB is a SIB1.

6. The processor of claim 5, wherein the SIB1 indicates that onboarding is supported for only a subset of UEs by setting an information element (IE) SNPN_ID bool_indicating_onboarding_allowed field to 0.

7. The processor of claim 5, wherein the SIB1 indicates that onboarding is supported for all UEs by setting an information element (IE) SNPN_ID bool_indicating_onboarding_allowed bool_indicating_onboarding_allowed_for_all_UEs field to 0.

8. A processor of a base station configured to perform operations comprising:
   transmitting standalone non-public network (SNPN) information in one or more broadcast messages, wherein the base station serves as an onboarding base station for the SNPN, wherein the one or more broadcast messages includes a system information block (SIB comprising a first indication of an SNPN identifier (SNPN-ID) for the SNPN, a second indication that the onboarding base station supports onboarding and a third indication that the onboarding base station supports onboarding either for all UEs or for only a subset of all UEs; and
   performing a procedure to onboard a user equipment (UE) to the SNPN when the UE determines that the onboarding base station is to be used for onboarding by the UE based on the SNPN information and UE SNPN information stored at the UE.

9. The processor of claim 8, wherein the SIB is a SIB1.

10. The processor of claim 9, wherein the SIB1 indicates that onboarding is supported for only a subset of UEs by setting an information element (IE) SNPN ID bool_indicating_onboarding_allowed field to 0.

11. The processor of claim 9, wherein the SIB1 indicates that onboarding is supported for all UEs by setting an information element (IE) SNPN_ID bool_indicating_onboarding_allowed bool_indicating_onboarding_allowed_for_all_UEs field to 0.

12. A processor of a user equipment (UE) configured to perform operations comprising:
   receiving standalone non-public network (SNPN) information from one or more broadcast messages transmitted from a base station serving as an onboarding base station for the SNPN, wherein the one or more broadcast messages further indicate onboarding base station support with a third party server;
   initiating an onboarding procedure to the onboarding base station when it is determined that the onboarding base station is to be used for onboarding by the UE;
   receiving an indication of a global vendor identifier (ID) for the third party server; and initiating an authentication procedure when the global vendor ID matches a stored global vendor ID on a subscriber identification module (SIM) of the UE.

13. The processor of claim 12, wherein the indication of the global vendor ID is received in a radio resource control (RRC) connection setup complete message.

14. The processor of claim 13, wherein the indication of the global vendor ID is an indexed vendor ID, wherein the operations further comprise:
receiving an indexed table with vendor IDs and associated indices in the RRC connection setup complete message or a system information block (SIB).

15. The processor of claim 12, wherein the indication of the global vendor ID is received in an NAS registration accept message during a first NAS authentication procedure, wherein the NAS registration accept message indicates re-registration is required,
wherein the UE initiates a second NAS authentication procedure using the global vendor ID.

16. The processor of claim 12, wherein the one or more broadcast messages indicating base station support with a third party server is received in a system information block (SIB).

17. The processor of claim 16, wherein the SIB is a SIB1.

* * * * *